United States Patent
Sahoo et al.

(10) Patent No.: US 9,792,931 B2
(45) Date of Patent: Oct. 17, 2017

(54) DEVICES INCLUDING A DIFUSSION BARRIER LAYER

(71) Applicant: SEAGATE TECHNOLOGY LLC, Cupertino, CA (US)

(72) Inventors: Sarbeswar Sahoo, Shakopee, MN (US); Martin Blaber, Plymouth, MN (US); Hui Brickner, Savage, MN (US); Tong Zhao, Eden Prairie, MN (US); Yuhang Cheng, Edina, MN (US); John Duda, Bloomington, MN (US); Tae-Woo Lee, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/060,914

(22) Filed: Mar. 4, 2016

(65) Prior Publication Data
US 2016/0275979 A1    Sep. 22, 2016

Related U.S. Application Data

(60) Provisional application No. 62/136,555, filed on Mar. 22, 2015, provisional application No. 62/167,314, filed on May 28, 2015.

(51) Int. Cl.
| | | |
|---|---|---|
| *G11B 11/00* | (2006.01) | |
| *G11B 5/31* | (2006.01) | |
| *G11B 5/60* | (2006.01) | |
| *G11B 5/00* | (2006.01) | |

(52) U.S. Cl.
CPC ............ *G11B 5/314* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| | | |
|---|---|---|
| 7,002,228 B2 | 2/2006 | Deak |
| 7,262,936 B2 | 8/2007 | Hamann |
| 7,791,839 B2 | 9/2010 | Olson |
| 8,116,034 B2 | 2/2012 | Komura |
| 8,213,272 B2 | 7/2012 | Takayama |
| 8,223,597 B2 | 7/2012 | Komura |

(Continued)

FOREIGN PATENT DOCUMENTS

KR    2015-0000440    1/2015

OTHER PUBLICATIONS

U.S. Appl. No. 14/935,768, filed Nov. 9, 2015, Cheng.
PCT International Search Report and Written Opinion dated Mar. 31, 2016 for PCT/US2015/059673 (11 pages).

*Primary Examiner* — Peter Vincent Agustin
(74) *Attorney, Agent, or Firm* — Mueting, Raasch & Gebhardt, P.A.

(57) ABSTRACT

Devices having an air bearing surface (ABS), the devices including a write pole; a near field transducer (NFT) that includes a peg and a disc, wherein the peg is at the ABS of the device; a heat sink positioned adjacent the disc of the NFT; a dielectric gap positioned adjacent the peg of the NFT at the ABS of the device; and a conformal diffusion barrier layer positioned between the write pole and the dielectric gap, the disc, and the heat sink, wherein the conformal diffusion barrier layer forms at least one angle that is not greater than 135°.

20 Claims, 5 Drawing Sheets

(56) References Cited

U.S. PATENT DOCUMENTS

| | | |
|---|---|---|
| 8,284,521 B2 | 10/2012 | Ohtsu |
| 8,339,740 B2 | 12/2012 | Zou |
| 8,477,454 B2 | 7/2013 | Zou |
| 8,670,215 B2 | 3/2014 | Zou |
| 8,971,161 B2 | 3/2015 | Cheng |
| 9,129,620 B2 | 9/2015 | Cheng |
| 9,449,625 B1 * | 9/2016 | Vossough ............. G11B 5/4866 |
| 2005/0190496 A1 | 9/2005 | Hamann |
| 2006/0114607 A1 * | 6/2006 | Pinarbasi ............. G11B 5/3116 360/119.09 |
| 2007/0069383 A1 | 3/2007 | Suzuki |
| 2009/0073858 A1 | 3/2009 | Seigler |
| 2010/0128579 A1 | 5/2010 | Seigler |
| 2010/0214685 A1 | 8/2010 | Seigler |
| 2010/0309581 A1 | 12/2010 | Wu |
| 2011/0002199 A1 | 1/2011 | Takayama |
| 2012/0045662 A1 * | 2/2012 | Zou ..................... G11B 5/3133 428/810 |
| 2012/0105996 A1 | 5/2012 | Katine |
| 2012/0127839 A1 | 5/2012 | Rawat |
| 2013/0070576 A1 | 3/2013 | Zou |
| 2013/0343167 A1 | 12/2013 | Zou |
| 2014/0050057 A1 * | 2/2014 | Zou ..................... G11B 33/144 369/13.33 |
| 2014/0050058 A1 * | 2/2014 | Zou .................. G11B 11/10534 369/13.33 |
| 2014/0313872 A1 | 10/2014 | Rawat |
| 2014/0376342 A1 * | 12/2014 | Wessel ................ G02B 6/1226 369/13.33 |
| 2016/0133280 A1 * | 5/2016 | Cheng ................ G11B 5/3106 369/13.33 |
| 2016/0275979 A1 * | 9/2016 | Sahoo ................. G11B 5/6082 |

\* cited by examiner

DEVICES INCLUDING A DIFUSSION BARRIER LAYER

PRIORITY

This application claims priority to U.S. Provisional Application Nos. 62/136,555 entitled HAMR DEVICES INCLUDING DIFFUSION BARRIERS, filed on Mar. 22, 2015 and 62/167,314 entitled, NFTS INCLUDING DIFFUSION BARRIER LAYERS, filed on May 28, 2015, the disclosures of which are incorporated herein by reference thereto.

SUMMARY

Disclosed are devices having an air bearing surface (ABS), the devices including a write pole; a near field transducer (NFT) that includes a peg and a disc, wherein the peg is at the ABS of the device; a heat sink positioned adjacent the disc of the NFT; a dielectric gap positioned adjacent the peg of the NFT at the ABS of the device; and a conformal diffusion barrier layer positioned between the write pole and the dielectric gap, the disc, and the heat sink, wherein the conformal diffusion barrier layer forms at least one angle that is not greater than 135°.

Also disclosed are devices having an air bearing surface (ABS), the devices including a write pole; a near field transducer (NFT) including a peg and a disc, wherein the peg is at the ABS of the device; a heat sink positioned adjacent the disc of the NFT; a dielectric gap positioned adjacent the peg of the NFT at the ABS of the device; and a conformal diffusion barrier layer positioned between the write pole and the dielectric gap, the disc, and the heat sink, wherein the conformal diffusion barrier layer forms at least one angle that is not greater than 110° and includes molybdenum (Mo), tantalum (Ta), niobium (Nb), hafnium (Hf), neodymium (Nd), holmium (Ho), molybdenum (Mo), tungsten (W), iridium (Ir), rhodium (Rh), ruthenium (Ru), rhenium (Re), titanium (Ti), zirconium (Zr), nickel (Ni), uranium (U), yttrium (Y), vanadium (V), or combinations thereof.

Also disclosed are devices having an air bearing surface (ABS), the devices including a write pole; a near field transducer (NFT) including a peg and a disc, wherein the peg is at the ABS of the device; a heat sink positioned adjacent the disc of the NFT; a dielectric gap positioned adjacent the peg of the NFT at the ABS of the device; and a conformal diffusion barrier layer positioned between the write pole and the dielectric gap, the disc, and the heat sink, wherein the conformal diffusion barrier layer includes rhenium (Re), vanadium (V), or combinations thereto.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Heat assisted magnetic recording (referred to through as HAMR) utilizes radiation, for example from a laser, to heat media to a temperature above its curie temperature, enabling magnetic recording. In order to deliver the radiation, e.g., a laser beam, to a small area (on the order of 20 to 50 nm for example) of the medium, a NFT is utilized. During a magnetic recording operation, the NFT absorbs energy from a laser and focuses it to a very small area; this can cause the temperature of the NFT to increase. The temperature of the NFT can be elevated up to about 400° C. or more.

The high temperatures that the NFT and surrounding structures reach during operation can lead to diffusion of the material of the write pole (e.g., iron (Fe) and cobalt (Co) atoms) towards the NFT through any of a number of interfaces because of the relatively high diffusion coefficients at the interfaces. Diffusion of the write pole material (e.g., Fe and Co) along the interfaces will change the composition and therefore optical properties of the peg, the cladding surrounding the NFT at the pole (e.g., the NFT to pole space—"NPS"), and the cladding surrounding the NFT at the core of the waveguide (e.g., the core to NFT space—"CNS"). These altered compositions will degrade the performance of the HAMR head and may cause early failure of the NFT.

Disclosed devices include diffusion barriers designed and configured to minimize or eliminate diffusion of the write pole material along the interfaces. Specifically, a diffusion barrier layer can be added to at least part of the pole/NPS interface, the pole/NFT interface, or both to prevent or minimize diffusion of the write pole material through the NPS/pole and NPS/NFT interfaces. The diffusion barrier may provide advantageous function as a diffusion barrier because of its density, conformality, or a combination thereof. Disclosed diffusion barriers may be more advantageous by not affording new pathways for diffusion of the pole materials. Deposition of a diffusion barrier that is not relatively dense, conformal or a combination thereof simply affords new pathways that may be utilized by the write pole atoms for diffusion to the NFT.

Figure 1:
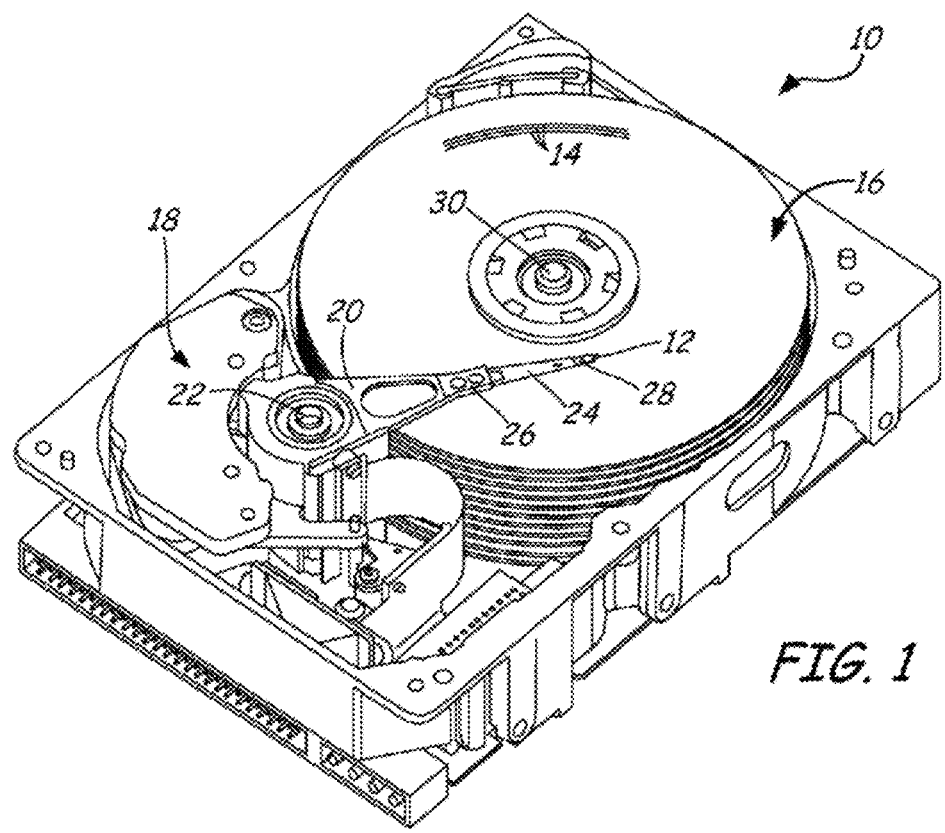
FIG. 1 is a perspective view of a magnetic disc drive that can include HAMR devices.

FIG. 1 is a perspective view of disc drive 10 including an actuation system for positioning slider 12 over track 14 of magnetic medium 16. The system depicted in FIGS. 1 and 2 can include disclosed structures and multilayer gas barrier layers. The particular configuration of disc drive 10 is shown for ease of description and is not intended to limit the scope of the present disclosure in any way. Disc drive 10 includes voice coil motor 18 arranged to rotate actuator arm 20 on a spindle around axis 22. Load beam 24 is connected to actuator arm 20 at head mounting block 26. Suspension 28 is connected to an end of load beam 24 and slider 12 is attached to suspension 28. Magnetic medium 16 rotates around an axis 30, so that the windage is encountered by slider 12 to keep it aloft a small distance above the surface of magnetic medium 16. Each track 14 of magnetic medium 16 is formatted with an array of data storage cells for storing data. Slider 12 carries a magnetic device or transducer (not shown in FIG. 1) for reading and/or writing data on tracks 14 of magnetic medium 16. The magnetic transducer utilizes additional electromagnetic energy to heat the surface of medium 16 to facilitate recording by a process termed heat assisted magnetic recording (HAMR).

Figure 2:
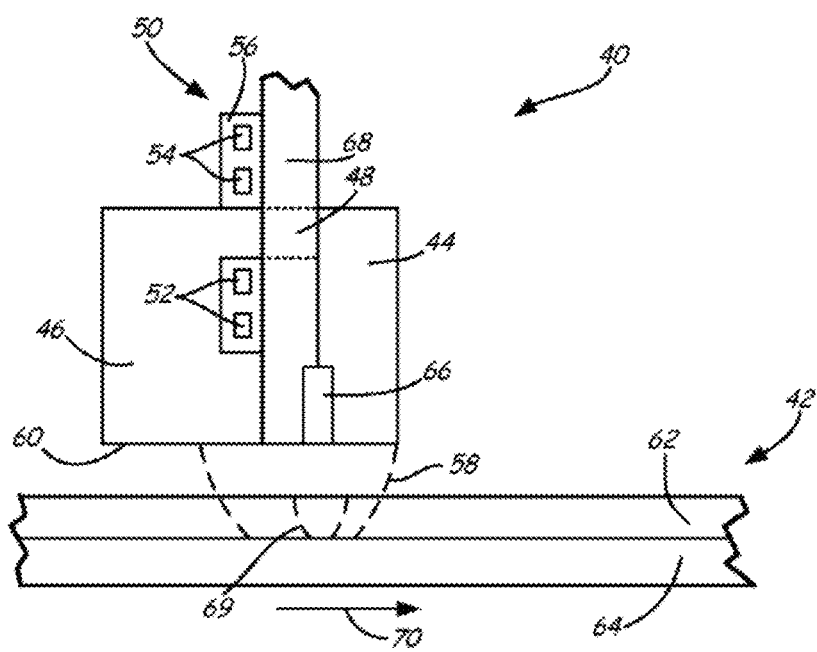
FIG. 2 is a cross sectional view of a perpendicular HAMR magnetic recording head and of an associated recording medium.

A HAMR transducer includes a magnetic writer for generating a magnetic field to write to a magnetic medium (e.g. magnetic medium 16) and an optical device to heat a portion of the magnetic medium proximate to the write field. FIG. 2 is a cross sectional view of a portion of a magnetic device, for example a HAMR magnetic device 40 and a portion of associated magnetic storage medium 42. HAMR magnetic device 40 includes write pole 44 and return pole 46 coupled by pedestal 48. Coil 50 comprising conductors 52 and 54 encircles the pedestal and is supported by an insulator 56. As shown, magnetic storage medium 42 is a perpendicular magnetic medium comprising magnetically hard storage layer 62 and soft magnetic underlayer 64 but can be other forms of media, such as patterned media. A current in the coil induces a magnetic field in the pedestal and the poles. Magnetic flux 58 exits the recording head at air bearing surface (ABS) 60 and is used to change the magnetization of portions of magnetically hard layer 62 of storage medium 42 enclosed within region 58. Near field transducer 66 is positioned adjacent the write pole 44 proximate air bearing surface 60. Near field transducer 66 is coupled to waveguide 68 that receives an electromagnetic wave from an energy source such as a laser. An electric field at the end of near field transducer 66 is used to heat a portion 69 of magnetically hard layer 62 to lower the coercivity so that the magnetic field from the write pole can affect the magnetization of the storage medium. As can be seen in FIG. 2, a portion of the near field transducer is positioned at the ABS 60 of the device.

Devices disclosed herein can also include other structures. Devices disclosed herein can be incorporated into larger devices. For example, sliders can include devices as disclosed herein. Exemplary sliders can include a slider body that has a leading edge, a trailing edge, and an air bearing surface. The write pole, read pole, optical near field transducer and contact pad (and optional heat sink) can then be located on (or in) the slider body. Such exemplary sliders can be attached to a suspension which can be incorporated into a disc drive for example. It should also be noted that disclosed devices can be utilized in systems other than disc drives such as that depicted in FIGS. 1 and 2.

Figure 3:
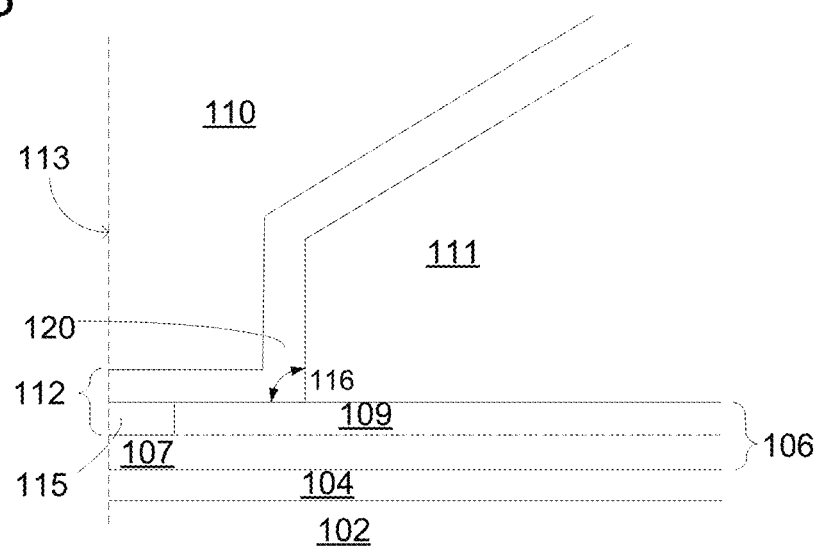
FIG. 3 is a cross-sectional view of a portion of an illustrative HAMR magnetic recording head including a diffusion barrier layer as disclosed herein.

FIG. 3 shows an enlarged view of a portion of HAMR magnetic recording head. The recording head includes a magnetic pole 110 that can be made of CoFe for example. The air bearing surface (ABS) 113 can be covered with or can be defined by an overcoat layer (not depicted in FIG. 3). The head can also include a waveguide 102 that can include a core layer sandwiched between cladding layers. For example, beneath the core layer can be a second cladding layer and above it can be a first cladding layer. Between the waveguide 102 and the NFT 106 is dielectric material, which can also be referred to as the core to NFT space or CNS 104. The CNS 104 can optionally be part of the waveguide, e.g., the first cladding layer, may be made of the same or a similar material as the dielectric material (CNS 104), or a combination thereof. Adjacent the air bearing surface 113 and the NFT 106 is dielectric material or a dielectric gap 115. The dielectric gap 115 can also make up a portion of the NFT to pole space, or NPS 112. The near field transducer (NFT) 106 can be considered as being made up of two portions, the peg 107 and the disc 109. The device can also include a heat sink 111. The heat sink 111 can be the same material or a different material than the disc 109 of the NFT. In some embodiments, the heat sink 111 and the disc 109 can be the same material, can be continuous or substantially continuous, or a combination thereof.

The device also includes a diffusion barrier layer 120. At the ABS, the dielectric gap 115 and the diffusion barrier layer 120 form the NFT to pole space, or NPS 112. In some embodiments, the diffusion barrier layer 120 can function to reduce diffusion of materials of the write pole into the NFT 106 and specifically into the peg 107 of the NFT 106. In some embodiments, the diffusion barrier layer 120 can function to reduce diffusion of materials of the write pole along the interface of the NPS and the NFT. Diffusion barriers that extend back (away from the ABS) to a distance behind the interface between the dielectric gap 115 and the disc 109 can reduce or prevent diffusion of pole materials along the interface between the dielectric gap 115 and the disc 109. Diffusion of materials from the pole to various other parts of the device can cause the composition of the NPS, the peg, the CNS, or any combination thereof to be changed. This can lead to failure of the NFT or decreased head performance, or both.

In some embodiments, the diffusion barrier layer 120 can be positioned at least between the dielectric gap 115 and the pole 120. In some embodiments, the diffusion barrier layer 120 can be positioned at least between the dielectric gap 115 and the pole 120 and between the pole 110 and the disc 109 at least some distance behind (in a direction opposite the ABS) the interface between the dielectric gap 115 and the disc 109. In some embodiments, the diffusion barrier layer 120 can be positioned at least between the dielectric gap 115 and the pole 120, between the pole 110 and the disc 109 at least some distance behind (in a direction opposite the ABS) the interface between the dielectric gap 115 and the disc 109, and between at least some portion of the disc 109 and the pole 110. In some embodiments, the diffusion barrier layer 120 can be positioned at least between the dielectric gap 115 and the pole 120, between the pole 110 and the disc 109 at least some distance behind (in a direction opposite the ABS) the interface between the dielectric gap 115 and the disc 109, between at least some portion of the disc 109 and the pole 110, and between at least some portion of the heat sink 111 and the write pole 110. In some embodiments, the diffusion barrier layer 120 can be positioned at least between the dielectric gap 115 and the pole 120, between the pole 110 and the disc 109 at least some distance behind (in a direction opposite the ABS) the interface between the dielectric gap 115 and the disc 109, between at least some portion of the disc 109 and the pole 110, and between at least most of the portion of the heat sink 111 that has a surface that is substantially parallel to the ABS and the write pole 110. In some embodiments, the diffusion barrier layer 120 can be positioned at least between the dielectric gap 115 and the pole 120, between the pole 110 and the disc 109 at least some distance behind (in a direction opposite the ABS) the interface between the dielectric gap 115 and the disc 109, between at least some portion of the disc 109 and the pole 110, and between substantially all of the portion of the heat sink 111 that has a surface that is substantially parallel to the ABS and the write pole 110. In some embodiments, the diffusion barrier layer 120 can be positioned at least between the dielectric gap 115 and the pole 120, between the pole 110 and the disc 109 at least some distance behind (in a direction opposite the ABS) the interface between the dielectric gap 115 and the disc 109, between at least some portion of the disc 109 and the pole 110, and between substantially all the heat sink 111 and the write pole 110. The latter embodiment is depicted in FIG. 3.

In some embodiments, the diffusion barrier layer can be referred to as a non-planar diffusion barrier layer. A non-planar diffusion barrier is one that is not simply a substantially flat layer between two other substantially flat layers. In some embodiments, the diffusion barrier layer can be referred to as a conformal diffusion barrier layer. A conformal diffusion barrier layer is one that conforms to the surfaces which it is positioned between. In some embodiments, a conformal diffusion barrier can include at least a portion that is at least somewhat planar between the dielectric gap 115 and the write pole 110, an optional portion that is between the disc 109 and the write pole 110 and which may or may not be substantially planar, an optional portion that is between the disc 111 and the write pole 110 and which may or may not be substantially planar. A non-planar, conformal (or both) diffusion barrier layer may include more than one portion that is itself substantially planar. For example, a non-planar and conformal diffusion barrier layer may include a portion that is substantially internally planar between the dielectric gap 115 and the write pole 110, another portion that is substantially internally planar between the disc 109 and the write pole 110 and another portion that is substantially internally planar between at least a portion of the heat sink 111 and the write pole 110. Although these portions can themselves be internally planar, they do not form a planar whole.

In some embodiments, a non-planar diffusion barrier layer can include at least a first angle that is not greater than 160°, not greater than 135°, or not greater than 110°. In some embodiments, a non-planar diffusion barrier layer can include at least a first angle that is from 70° to 110°, from 80° to 100°, or from 85° to 95°. In some embodiments, this first angle in the diffusion barrier layer can be formed by portions of the diffusion barrier layer that are adjacent the disc 109 and the heat sink 111. This angle is depicted in FIG. 3 as 116. In the particular illustration shown in FIG. 3, the angle is about 90°.

Diffusion barrier layers can be described by the thickness thereof. In some embodiments, diffusion barrier layers can have a thickness that is sufficient to produce a barrier layer that minimizes or prevents diffusion, therefore the layer must be at least constant across the span of the barrier layer. In some embodiments diffusion barrier layers can have a thickness that is not so great that the NPS becomes too large to provide desired functioning of the device. In some illustrative embodiments, the diffusion barrier layer can have a thickness of not less than 5 nanometers (nm), not less than 8 nm, not less than 10 nm, or not less than 12 nm. In some illustrative embodiments, the diffusion barrier layer can have a thickness of not greater than 50 nm, not greater than 30 nm, not greater than 25 nm, or not greater than 15 nm.

In order for disclosed diffusion barrier layers to more effectively reduce or prevent diffusion of pole materials into the NFT (for example), the nature of the material making up the diffusion barrier layer can be important. The bulk properties of the material, the identity of the material, which provides various properties or combinations thereof can all be relevant in determining how effectively the diffusion barrier layer can be to minimize or prevent diffusion there through.

In some embodiments, one bulk or physical property of the material that can play a role in how effective the diffusion barrier layer is at minimizing or preventing diffusion includes the density of the material. A diffusion barrier layer that is not sufficiently dense may allow paths for diffusion there through, while in contrast, a diffusion barrier layer that is sufficiently dense does not include diffusion pathways there through. In some embodiments, a diffusion barrier layer can be least 80% dense, at least 90% dense, at least 95% dense, or about 100% dense.

Because of the non-planar nature of some embodiments of disclosed diffusion barrier layers and the desire to have a sufficiently dense diffusion barrier layer, the method of forming the diffusion barrier layer may be important. In some embodiments, a method of deposition that provides conformal, relatively uniform coverage can be utilized. In some embodiments, useful deposition methods can include, for example vapor deposition methods such as chemical vapor deposition (CVD), atomic layer deposition (ALD), ion beam deposition (IBD) (e.g., with controlled angles relative to normal), pulsed cusp magnetron (2PCM) physical vapor deposition (PVD), angular PVD (e.g., 4PVD/5PVD), electrodeposition methods and sputtering, as well as others. In some embodiments, CVD or ALD can be utilized. In some embodiments CVD can be utilized.

Materials that may be useful as diffusion barrier layer materials can include those with a low solubility in the material of the NFT, the material of the write pole, or both; those with a low oxidation resistance; or combinations thereof. In some embodiments, the particular material chosen can have a solubility in the write pole, the NFT, or both that is relatively low. In some embodiments, the particular material chosen can have a solubility in the write pole, the NFT, or both that is relatively low even at elevated temperatures (e.g., greater or equal to about 100° C.). Alternatively, or in addition, the thermal stability of the possible diffusion barrier layer material can be considered. In some embodiments, a material or materials for a diffusion barrier layer can have a relatively high thermal stability so that the layer can maintain or substantially maintain its physical shape and dimensions. In some embodiments, a material or materials for a diffusion barrier layer can have a relatively high melting point. The thermal conductivity of the material for the diffusion barrier layer can also be considered. Addition of a diffusion barrier layer between the pole and the NFT could affect the thermal conduction from the NFT to the pole, which could significantly affect the reliability of the HAMR head. This can be at least partially compensated for by having the diffusion barrier layer cover only part of the NFT, still affording the NFT or more specifically the heat sink of the NFT direct thermal contact with the pole to allow heat to be dissipated to the pole. Additionally, or instead of that the diffusion barrier layer material can be one that has a relatively high thermal conductivity to allow heat to be dissipated to the diffusion barrier layer material.

Alternatively, or in addition, the oxidation resistance of the possible material for the diffusion barrier layer can be considered. During HAMR writing, reactive gases, (e.g., $O_2$, $H_2O$, HF, or others) could permeate through the overcoat layer and react with the diffusion barrier layer. Such reactions could change the mechanical, physical, and chemical properties of the diffusion barrier layer, generate internal stress, create defects in the layer, or combinations thereof. Therefore, materials that are relatively resistant to reaction with reactive gases (e.g., $O_2$, $H_2O$, HF, or others) could be useful.

The material of the diffusion barrier layer can also be chosen based on optical properties. In some embodiments, a material or materials for the diffusion barrier layer can have relatively low n and relatively high k to reduce the amount of light absorbed by the diffusion barrier layer.

By considering the above noted properties, additional properties not discussed herein, or combinations thereof material(s) for the diffusion barrier layer can be chosen.

In some embodiments, the diffusion barrier layer could include a metal or metals. Illustrative metals that can be utilized for the diffusion barrier layer can include molybdenum (Mo), tantalum (Ta), niobium (Nb), hafnium (Hf), neodymium (Nd), holmium (Ho), molybdenum (Mo), tungsten (W), iridium (Ir), rhodium (Rh), ruthenium (Ru), rhenium (Re), titanium (Ti), zirconium (Zr), nickel (Ni), uranium (U), yttrium (Y), vanadium (V), or combinations thereof. In some embodiments, diffusion barrier layers disclosed herein can include Ru, Ir, Ta, Zr, Nb, Hf, or combinations thereof. In some embodiments, diffusion barrier layers disclosed herein can include Ta, Ir, Ru, Zr, or combinations thereof.

Mo, Nb, Ni, Nd, Ho, Zr, Y, and Ir may be useful because of their relatively high melting points, relatively high oxidation resistance, relatively low solubility to gold and relatively good thermal conductivity. Similarly, Mo, W, Nb, Nd, Ni, Ho, Zr and Y may be useful because they have relatively low solubility in both gold (Au) and iron (Fe). Similarly Ir also had low solubility in Au. In some embodiments Ta, W, Ti, Rh, or Ru may also be utilized in diffusion barrier layers. Any of Ta, W, Ti, Rh, and Ru may be useful because of their relatively high melting points, relatively high oxidation resistance, relatively low solubility in gold and relatively good thermal conductivity.

Figure 4:
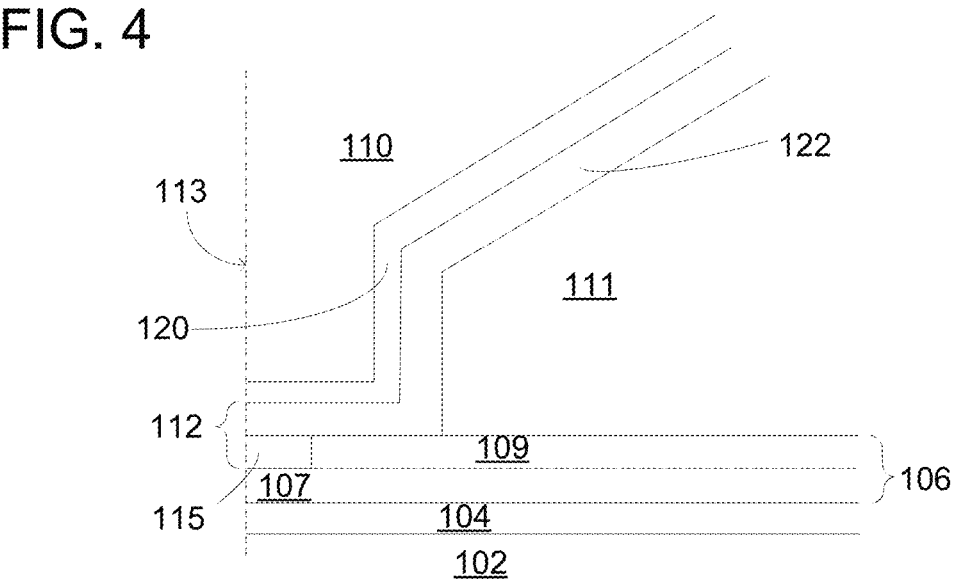
FIG. 4 is a cross-sectional view of a portion of an illustrative HAMR magnetic recording head including a diffusion barrier layer and an optional peg coupler layer as disclosed herein.

Optionally, a layer may be added between the diffusion barrier layer and the dielectric gap 115, the disc 109, the heat sink 111, or any combinations thereof to increase thermal gradient, increase areal density, or combinations thereof. This optional layer can be referred to as a peg coupler layer. FIG. 4 shows a portion of a magnetic recording head that includes a diffusion barrier layer 120 and a peg coupler layer 122. In some embodiments, the peg coupler layer 122 can function to increase the thermal gradient between the diffusion barrier layer 120 and the dielectric gap 115, the disc 109, the heat sink 111, or any combination thereof, for example. The optional peg coupler layer can include various materials, including for example the materials of the peg, the disc, or the heat sink. In some embodiments, the optional peg coupler layer can include a plasmonic element or an alloy containing a plasmonic element. In some embodiments optional peg coupler layers can include gold (Au), or an alloy of Au, for example. The optional peg coupler layer can have a thickness of not less than 5 nm, not less than 8 nm, or not less than 10 nm for example. In some embodiments, the optional peg coupler layer can have a thickness of not greater than 25 nm, not greater than 20 nm, or not greater than 15 nm. It should be noted that a maximum desired NPS of not greater than 50 nm may contribute to an upper limit of the thickness of the optional peg coupler layer.

In some embodiments, details related to the peg coupler layer can be found in commonly assigned U.S. patent application Ser. No. 14/886,524 filed on Oct. 19, 2015, entitled STRUCTURE POSITIONED BETWEEN MAGNETIC POLE AND NEAR-FIELD TRANSDUCER, and inventors Tae-Woo Lee and David Grundman; the disclosure of which is incorporated herein by reference thereto.

Figure 5:
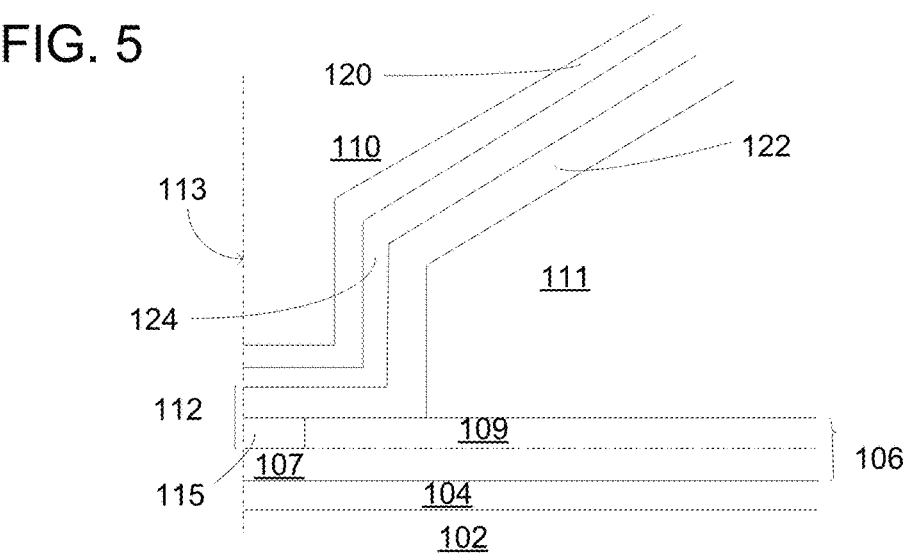
FIG. 5 is a cross-sectional view of a portion of an illustrative HAMR magnetic recording head including a diffusion barrier layer, an optional peg coupler layer and an optional etch stop layer as disclosed herein.

Optionally, an additional or alternative layer may also be included, an etch stop layer. An etch stop layer can function to enable a process of making the disclosed device or making it easier, more efficient, or more reliably controllable to make a disclosed device. For example, an etch stop layer can function to allow etching of the write pole and specifically the etch stop layer provides a method of controlling the etching of the write pole. FIG. 5 shows a portion of a magnetic recording head that includes a diffusion barrier layer 120, an etch stop layer 124 and a peg coupler layer 122. In some embodiments, the etch stop layer can include any material that has a rate of etching that is substantially different (in the relevant type of etching) than is the write pole material. In some embodiments, the optional etch stop layer can include tantalum (Ta), titanium (Ti), chromium (Cr), or materials containing any of these elements such as TaN and TiN for example, or combinations thereof. The optional etch stop layer can have a thickness of not less than 5 nm, not less than 8 nm, or not less than 10 nm for example. In some embodiments, the optional etch stop layer can have a thickness of not greater than 25 nm, not greater than 20 nm, or not greater than 15 nm. It should be noted that a maximum desired NPS of not greater than 50 nm may contribute to an upper limit of the thickness of the optional etch stop layer. In some embodiments, a diffusion barrier layer itself can also function as an etch stop layer, in which case an additional etch stop layer may not be necessary. In some embodiments, an etch stop layer itself can also function as a peg coupler layer, in which case an additional peg coupler layer may not be necessary.

It should be noted that embodiments can include only one of the etch stop layer and peg coupler layer (as opposed to both as depicted in FIG. 5), neither the etch stop layer or peg coupler layer, or both the etch stop layer and the peg coupler layer.

In some embodiments, the NFT, or more specifically, the peg, the disc, the heat sink or any combination thereof can be made of a plasmonic material. Illustrative NFT materials can include plasmonic materials such as gold (Au), silver (Ag), aluminum (Al), copper (Cu), ruthenium (Ru), rhodium (Rh), iridium (Ir), or alloys thereof; titanium nitride (TiN), zirconium nitride (ZrN), or combinations thereof; thermally conductive oxides; indium tin oxide (ITO); and combinations thereof. In some embodiments, illustrative NFT materials can also include those disclosed in U.S. Patent Publication No. 2013/0286799; and U.S. Pat. Nos. 8,830,800, 8,427,925, and 8,934,198; the disclosures of which are incorporated herein by reference thereto.

The CNS 104, dielectric gap 115, and cladding layers of the waveguide 104, or any combinations thereof can be made of the same or different material. Any of the cladding layers or structures can generally be formed from dielectric materials having low (relative to the material of the NFT) index of refractions. Illustrative materials can include $Ta_2O_5$, $Al_2O_3$, $SiO_2$, MgO, MgF2, $Si_3N_4$, SiON, and $TaSiO_x$. Materials disclosed in United States Patent Publication No. 2011/0205864, entitled "Optical Waveguide Clad Material", filed Feb. 23, 2011, the disclosure of which is incorporated herein by reference thereto to the extent it does not conflict, can also be utilized for any of the cladding layers or structures. In embodiments, the cladding layers or structures can be made of $Al_2O_3$ or $SiO_2$ for example.

Examples

Figure 6:
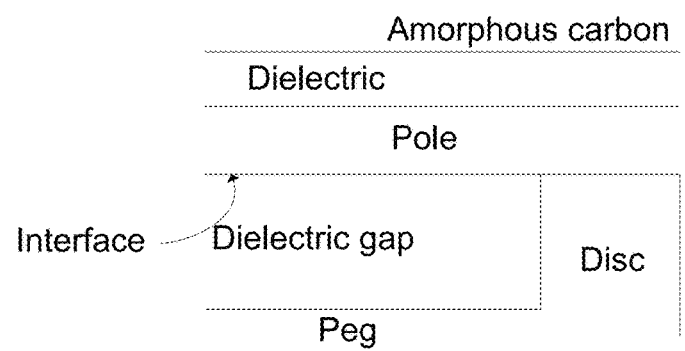
FIG. 6 is a schematic illustration of structures formed and utilized in the Examples herein.

FIG. 6 shows a structure that was formed in order to examine the effect of a diffusion barrier layer. The dielectric gap was made of AlO (deposited using ALD or PVD), the peg and the disc were made of gold (deposited using 2PCM PVD), the pole was made of FeCo (deposited using electroplating/electro-deposition), and the dielectric was AlO. It should be noted that the dielectric over the top of the surface was added merely to prevent oxidation of the FeCo. Structures were made with no layer at the interface, a 10 nm layer of zirconium (Zr) (deposited using 5PVD or 2PCM), a 10 nm layer of tantalum (Ta) (deposited using PVD), and a 10 nm layer of ruthenium (Ru) (deposited using CVD). The structures were subjected to focused ion beam (FIB) analysis initially, after 3 hours annealing at 300° C., and after 3 hours annealing at 400° C.

Figure 7A:
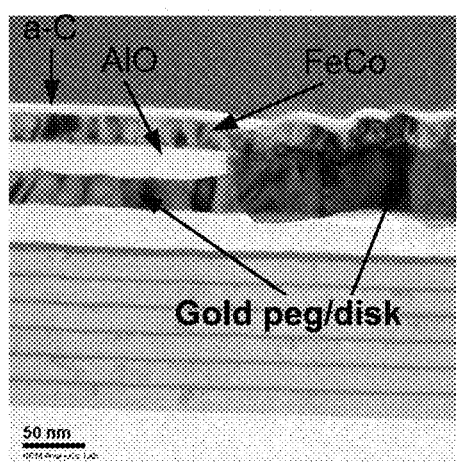
FIGS. 7A to 7E show scanning electron microscope (SEM) images of the control structure (no layer at the interface) identifying the structures (FIG. 7A), before testing at 20 nm magnification (FIG. 7B), after 3 hours annealing at 300° C. at 20 nm magnification (FIG. 7C), and after 3 hours annealing at 400° C. at 20 nm magnification (FIG. 7D), and the area of quantification using energy dispersive X-rap (EDX) spectroscopy at 100 nm magnification (FIG. 7E).
Figure 7B:
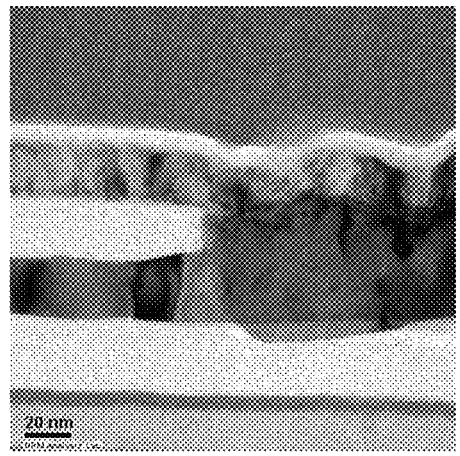
Figure 7C:
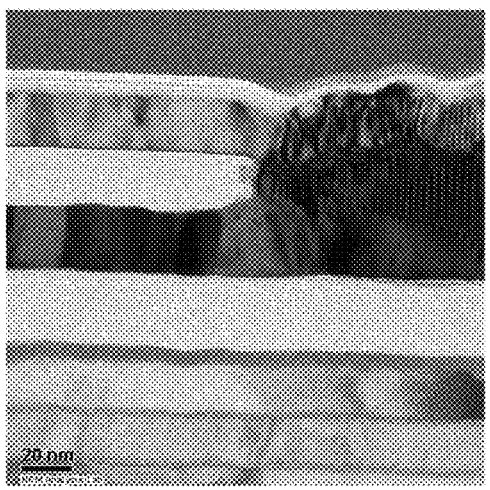
Figure 7D:
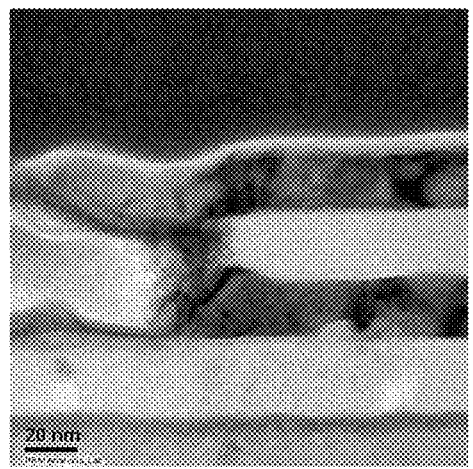
Figure 7E:
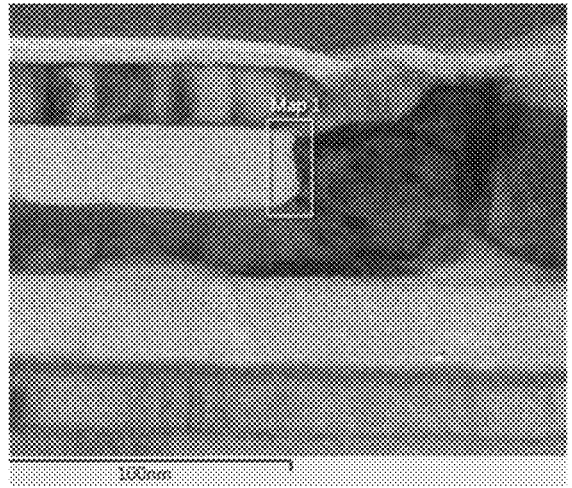

FIGS. 7A to 7E show scanning electron microscope (SEM) images of the control structure (no layer at the interface) identifying the structures (FIG. 7A), before testing at 20 nm magnification (FIG. 7B), after 3 hours annealing at 300° C. at 20 nm magnification (FIG. 7C), and after 3 hours annealing at 400° C. at 20 nm magnification (FIG. 7D), and the area of quantification by energy dispersive X-rap (EDX) spectroscopy (FIG. 7E).

Figure 8:
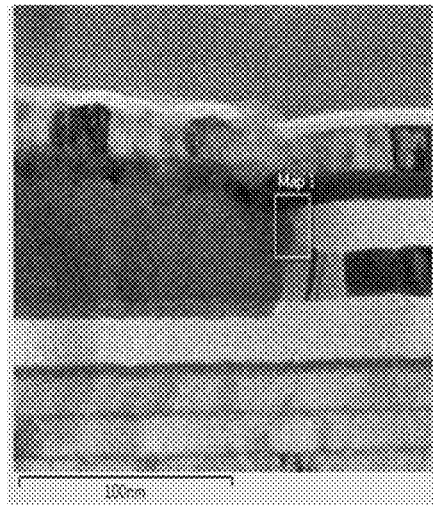
FIG. 8 is a SEM image of an illustrative structure including a tantalum (Ta) diffusion barrier layer.
Figure 9:
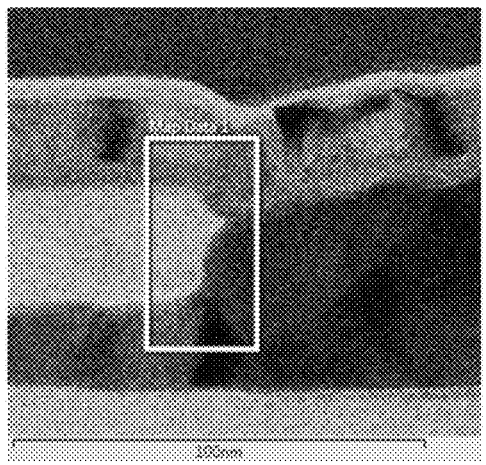
FIG. 9 is a SEM image of an illustrative structure including a zirconium (Zr) diffusion barrier layer.
Figure 10:
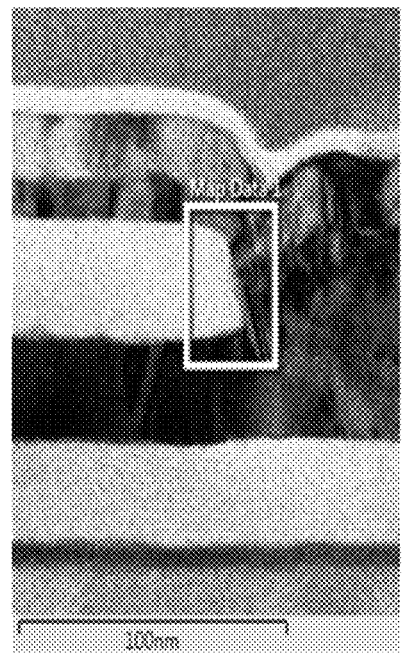
FIG. 10 is a SEM image of an illustrative structure including a ruthenium (Ru) diffusion barrier layer.

FIG. 8 shows the SEM image of the structure that includes 10 nm Ta at the interface. FIG. 9 shows the SEM image of the structure that includes 10 nm Zr at the interface. FIG. 10 shows the SEM image of the structure that includes 10 nm Ru at the interface. Table 1 below shows the weight percent of oxygen, aluminum, iron, cobalt, nickel and gold within the quantification box (as depicted in FIGS. 7E, 8, 9, and 10) of the structures.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differ-

TABLE 1

|  | Control | | With 10 nm Ta | | With 10 nm Zr | | With 10 nm Ru | |
| --- | --- | --- | --- | --- | --- | --- | --- | --- |
|  | Wt % | Wt % Sigma | Wt % | Wt % Sigma | Wt % | Wt % Sigma | Wt % | Wt % Sigma |
| Oxygen (O) | 11.37 | 1.49 | 8.34 | 1.43 | 11.57 | 1.44 | 12.3 | 1.52 |
| Aluminum (Al) | 15.12 | 1.34 | 10.3 | 1.46 | 16.5 | 1.38 | 16.8 | 1.52 |
| Iron (Fe) | 5.48 | 0.86 | 0.22 | 0.15 | 0 | 0 | 0 | 0 |
| Cobalt (Co) | 0.00 | 0.00 | 0 | 0 | 0 | 0 | 0 | 0 |
| Nickel (Ni) | 0.00 | 0.00 | 0 | 0 | 0 | 0 | 0 | 0 |
| Gold (Au) | 68.03 | 2.24 | 78 | 3.24 | 62 | 2.44 | 72 | 2.48 |

All scientific and technical terms used herein have meanings commonly used in the art unless otherwise specified. The definitions provided herein are to facilitate understanding of certain terms used frequently herein and are not meant to limit the scope of the present disclosure.

entiate from another infusion device (such as a "first" substrate). Use of "first," "second," etc. in the description above and the claims that follow is also not necessarily intended to indicate that one comes earlier in time than the other.

As used herein, "about" or "approximately" shall generally mean within 20 percent, within 10 percent, or within 5 percent of a given value or range. "about" can also in some embodiments imply a range dictated by a means of measuring the value at issue. Other than in the examples, or where otherwise indicated, all numbers are to be understood as being modified in all instances by the term "about".

Thus, embodiments of devices including a diffusion barrier layer are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A device having an air bearing surface (ABS), the device comprising:
   a write pole;
   a near field transducer (NFT) comprising a peg and a disc, wherein the peg is at the ABS of the device;
   a heat sink positioned adjacent the disc of the NFT;
   a dielectric gap positioned adjacent the peg of the NFT at the ABS of the device; and
   a conformal diffusion barrier layer positioned between the write pole and the dielectric gap, the disc, and the heat sink and directly adjacent the gap, the disc and the heat sink, wherein the conformal diffusion barrier layer forms at least one angle that is not greater than 135°.

2. The device according to claim 1, wherein the conformal diffusion barrier layer comprises molybdenum (Mo), tantalum (Ta), niobium (Nb), hafnium (Hf), neodymium (Nd), holmium (Ho), molybdenum (Mo), tungsten (W), iridium (Ir), rhodium (Rh), ruthenium (Ru), rhenium (Re), titanium (Ti), zirconium (Zr), nickel (Ni), uranium (U), yttrium (Y), vanadium (V), or combinations thereof.

3. The device according to claim 1, wherein the conformal diffusion barrier layer comprises ruthenium (Ru), iridium (Ir), tantalum (Ta), zirconium (Zr), niobium (Nb), hafnium (Hf), or combinations thereof.

4. The device according to claim 1, wherein the conformal diffusion barrier layer comprises ruthenium (Ru), iridium (Ir), tantalum (Ta), zirconium (Zr), or combinations thereof.

5. The device according to claim 1, wherein the conformal diffusion barrier layer is positioned directly adjacent the write pole.

6. The device according to claim 1, wherein the conformal diffusion barrier layer has a thickness from about 5 nanometers (nm) to about 30 nm.

7. The device according to claim 1 further comprising a peg coupler layer, the peg coupler layer positioned between the conformal diffusion barrier layer and the dielectric gap, NFT and heat sink.

8. The device according to claim 7, wherein the peg coupler layer comprises gold (Au) or an alloy thereof.

9. The device according to claim 7, wherein the peg coupler layer has a thickness from about 8 nm to about 25 nm.

10. The device according to claim 1 further comprising an etch stop layer, the etch stop layer positioned adjacent the conformal diffusion barrier layer on the opposite side of the write pole.

11. The device according to claim 10, wherein the etch stop layer comprises tantalum (Ta), titanium (Ti), chromium (Cr), tantalum nitride (TaN), titanium nitride (TiN), or combinations thereof.

12. A device having an air bearing surface (ABS), the device comprising:
    a write pole;
    a near field transducer (NFT) comprising a peg and a disc, wherein the peg is at the ABS of the device;
    a heat sink positioned adjacent the disc of the NFT;
    a dielectric gap positioned adjacent the peg of the NFT at the ABS of the device; and
    a conformal diffusion barrier layer positioned between the write pole and the dielectric gap, the disc, and the heat sink and directly adjacent the gap, the disc and the heat sink, wherein the conformal diffusion barrier layer forms at least one angle that is not greater than 110° and comprises molybdenum (Mo), tantalum (Ta), niobium (Nb), hafnium (Hf), neodymium (Nd), holmium (Ho), molybdenum (Mo), tungsten (W), iridium (Ir), rhodium (Rh), ruthenium (Ru), rhenium (Re), titanium (Ti), zirconium (Zr), nickel (Ni), uranium (U), yttrium (Y), vanadium (V), or combinations thereof.

13. The device according to claim 12, wherein the conformal diffusion barrier layer comprises zirconium (Zr), ruthenium (Ru), or combinations thereof.

14. The device according to claim 12, wherein the NFT comprises gold (Au) or an alloy thereof.

15. The device according to claim 12, wherein the conformal diffusion barrier has a thickness from about 5 nm to about 30 nm.

16. The device according to claim 12 further comprising a peg coupler layer, the peg coupler layer positioned between the conformal diffusion barrier layer and the dielectric gap, NFT and heat sink.

17. The device according to claim 12 further comprising an etch stop layer, the etch stop layer positioned adjacent the conformal diffusion barrier layer on the opposite side of the write pole.

18. A device having an air bearing surface (ABS), the device comprising:
    a write pole;
    a near field transducer (NFT) comprising a peg and a disc, wherein the peg is at the ABS of the device;
    a heat sink positioned adjacent the disc of the NFT;
    a dielectric gap positioned adjacent the peg of the NFT at the ABS of the device; and
    a conformal diffusion barrier layer positioned between the write pole and the dielectric gap, the disc, and the heat sink and directly adjacent the gap, the disc and the heat sink, wherein the conformal diffusion barrier layer comprises rhenium (Re), vanadium (V), or combinations thereto.

19. The device according to claim 18, wherein the conformal diffusion barrier layer forms at least one angle that is not greater than 160°.

20. The device according to claim 18, wherein the conformal diffusion barrier layer has a thickness from about 8 nm to about 15 nm.

* * * * *